Patented Dec. 8, 1931

1,835,421

UNITED STATES PATENT OFFICE

EMIL E. NOVOTNY, OF PHILADELPHIA, PENNSYLVANIA, ASSIGNOR TO JOHN STOGDELL STOKES, OF SPRING VALLEY FARMS, HUNTINGDON VALLEY POST OFFICE, PENNSYLVANIA

CAMERA PART

No Drawing. Application filed June 13, 1929. Serial No. 370,730.

The object of this invention is to provide a suitable thermo rigid molding composition for the production of photographic camera parts and bodies including plate and film holders and slides.

I am aware that it has been proposed to mold such parts from phenol resins of the potentially reactive type and that camera bodies and plate holder slides have actually been made. While such products are mechanically strong and capable of fabrication into the desired shapes, these products tend to fog the photographic surface.

While rubber does not fog the photographic surface, the material is not strong enough. This material has been used for plate holder slides for many years but its brittleness has been an objection.

In studying the action of phenol resins on photographic surfaces, I have found that the presence of phenolic bodies or traces of free phenol is responsible for the fogging of plates and films. Further, it is the action of the phenolic material on the silver bromide emulsion.

It has been found commercially too expensive and difficult to produce a phenol resin which will not fog the silver emulsion.

I have fond that urea or thiourea resins and plastics give strong, well molded parts, and where the formaldehyde is all or substantially all combined no fogging results.

These products are procurable on the market from several sources or else may be made by the methods described in application Serial No. 328,060, of December 22, 1928, of Novotny and Wilson.

These thiourea plastics can be molded in various ways as in the form of a powder or sheetlike products of paper or cloth impregnated with the material. As the products in thin section are translucent it is preferable to incorporate therewith suitable opaque materials such as opaque pigments or fillers such as lamp black, superlith, etc.

Instead of the urea and or thiourea formaldehyde resins I may use to good advantage other resins of the phenol free type such as glyptal resins as of glycerine-phthalic anhydride or of the acetone-aldehyde types.

These resins can be molded into difficult shapes, are wear and moisture resistant and will reproduce any desired surface ornamentation. They can be formed with great precision at low cost and are of light weight. By the use of these phenol free resins, parts for cameras, plate holders, etc. which enclose the sensitive photographic surface can be readily and inexpensively made in large numbers.

What I claim is—

1. A camera part formed of a phenol free synthetic resin, which resin will not react to cause fogging when in proximity to a light sensitive silver bromide emulsion.

2. A camera part comprising a molded phenol free urea synthetic resin characterized by freedom from the tendency to cause fogging of light sensitive silver bromide emulsions.

3. A camera part consisting of a molded thiourea composition, said molded composition being characterized by freedom from the tendency to cause fogging of light sensitive emulsions.

4. A camera part formed of a laminated sheet-like body including a phenol free urea condensation product, said product being free from the tendency to cause fogging of light sensitive emulsions contained in the camera.

Signed at Philadelphia in the county of Philadelphia and State of Pennsylvania this fourth day of June, A. D. 1929.

EMIL E. NOVOTNY.